United States Patent
Holub et al.

(10) Patent No.: US 9,741,082 B2
(45) Date of Patent: Aug. 22, 2017

(54) DISTRIBUTED HVAC SYSTEM COST OPTIMIZATION

(71) Applicant: Honeywell International Inc., Morristown, NJ (US)

(72) Inventors: Ondrej Holub, Prague (CZ); Giancarlo Mantovani, Milan (CZ); Karel Marik, Revnice (CZ)

(73) Assignee: Honeywell International Inc., Morris Plains, NJ (US)

( * ) Notice: Subject to any disclaimer, the term of this patent is extended or adjusted under 35 U.S.C. 154(b) by 638 days.

(21) Appl. No.: 14/202,963

(22) Filed: Mar. 10, 2014

(65) Prior Publication Data

US 2015/0253030 A1 Sep. 10, 2015

(51) Int. Cl.
  *F24F 11/00* (2006.01)
  *G05B 15/02* (2006.01)
  *G06Q 50/06* (2012.01)

(52) U.S. Cl.
  CPC ............ *G06Q 50/06* (2013.01); *F24F 11/006* (2013.01); *G05B 15/02* (2013.01)

(58) Field of Classification Search
  CPC ............... F24F 11/0086; F24F 11/0001; F24F 11/0012; F24F 2011/0091; F24F 2011/0075; F24F 11/006; F06Q 50/06; G05B 15/02
  See application file for complete search history.

(56) References Cited

U.S. PATENT DOCUMENTS

| 8,892,264 | B2 * | 11/2014 | Steven | G06Q 50/06 700/286 |
| 8,918,219 | B2 * | 12/2014 | Sloo | F24F 11/0086 236/1 C |
| 9,342,082 | B2 * | 5/2016 | Guenette | F24F 11/006 |
| 9,459,018 | B2 * | 10/2016 | Fadell | F24F 11/0009 |

(Continued)

OTHER PUBLICATIONS

Parisio et al., Randomized Model Predictive Control for HVAC Systems, Nov. 2013, 8 pages.*

(Continued)

*Primary Examiner* — Thuy Dao
(74) *Attorney, Agent, or Firm* — Schwegman Lundberg & Woessner, P.A.

(57) ABSTRACT

Various embodiments herein include at least one of systems, devices, methods, and methods for distributed HVAC system cost optimization. Such embodiments are generally implemented within a controller of HVAC system component, such as within boiler, cooler, air handling unit, and rooftop unit controllers. In some embodiments, multiple controllers exchange data to control various components of an HVAC system. One of the controllers, such as a primary plant of the system for heating or cooling, is designated as a master controller and the other component controllers are designated as slave controllers. Each controller, both master and slave controllers, includes at least one model that models variable settings of the component or components for which the respective controller is responsible. The model is utilized by the respective controller to both adjust the modeled variable component settings and to determine a cost-variable of operation.

17 Claims, 3 Drawing Sheets

(56) References Cited

U.S. PATENT DOCUMENTS

| | | | | |
|---|---|---|---|---|
| 2011/0106328 A1* | 5/2011 | Zhou | G05B 13/024 | |
| | | | | 700/291 |
| 2014/0058567 A1* | 2/2014 | Matsuoka | G05D 23/1917 | |
| | | | | 700/276 |
| 2014/0316584 A1* | 10/2014 | Matsuoka | G05D 23/1917 | |
| | | | | 700/278 |
| 2015/0241078 A1* | 8/2015 | Matsuoka | H04L 12/2825 | |
| | | | | 700/278 |
| 2016/0377309 A1* | 12/2016 | Abiprojo | F24F 11/0086 | |
| | | | | 700/276 |

OTHER PUBLICATIONS

Erickson et al., Thermovote: participatory sensing for efficient building HVAC conditioning, Nov. 2012, 8 pages.*

* cited by examiner

DISTRIBUTED HVAC SYSTEM COST OPTIMIZATION

BACKGROUND INFORMATION

Reduction of Heating, Ventilation, and Air Conditioning (HVAC) system energy consumption is highly desired for both financial and environmental reasons. There are solutions available that attempt to reduce HVAC system energy consumption, but such solutions are not scalable for larger HVAC systems. Further, such solutions often suffer from excessive complexity, communications, computational load, and iterative negotiations between HVAC system and component controllers. Due to these factors, it is generally uncommon for such solutions to achieve desired energy-saving results.

DETAILED DESCRIPTION

Figure 1:
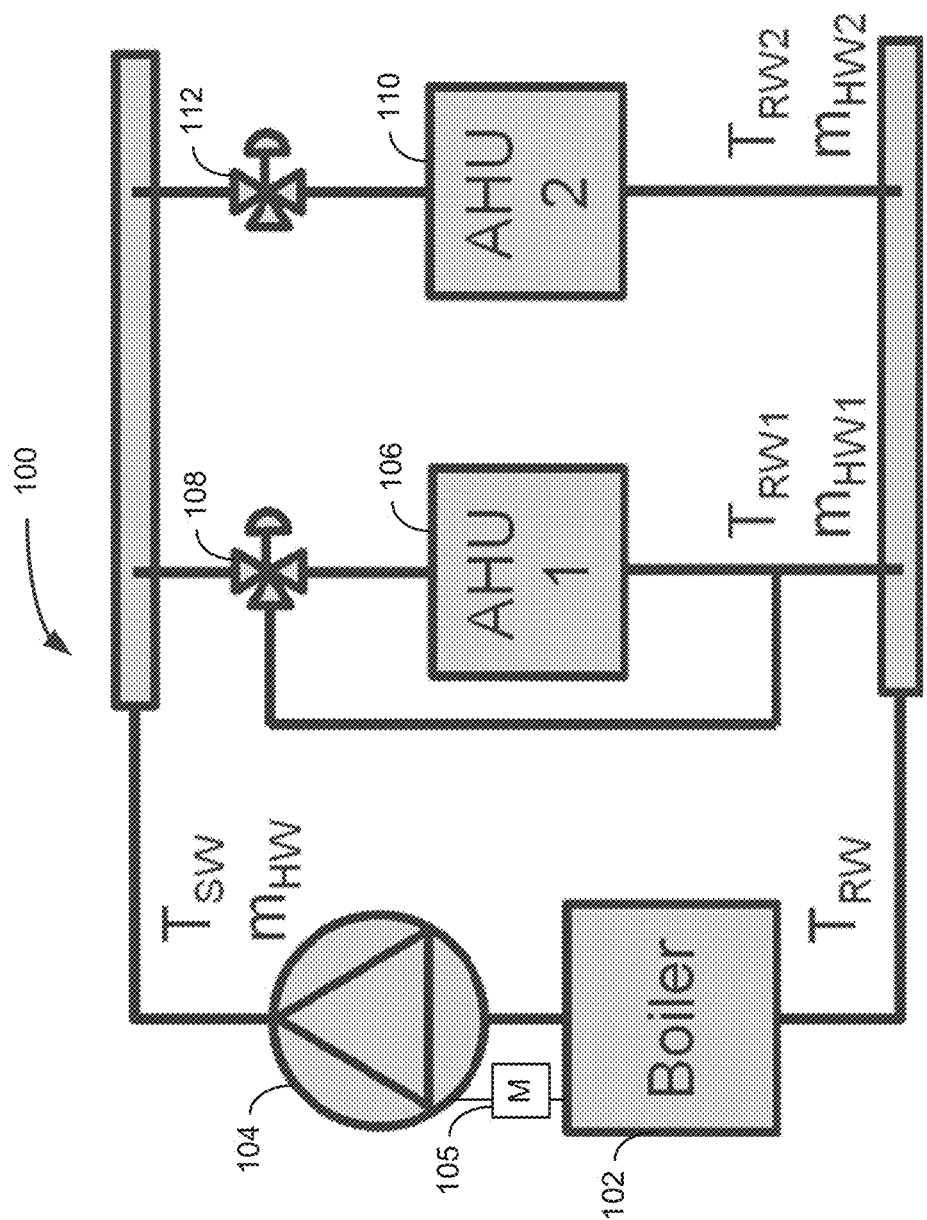
FIG. 1 is a logical block diagram of an example HVAC system, according to an example embodiment.

Various embodiments herein each include at least one of systems, devices, methods, and methods for distributed HVAC system cost optimization. Such embodiments are generally implemented within one or more controllers of a component of an HVAC system, such as within boiler, cooler, air-handling unit (AHU), and rooftop unit (RTU) controllers. In some embodiments, multiple controllers are communicatively coupled to exchange data and to control various components of an HVAC system. One of the controllers, such as a primary plant of the system for heating (i.e., boiler) or air conditioning, is designated as a master controller and the other component controllers (i.e., AHU and RTU) are designated as slave or secondary controllers. Each controller, both master and slave controllers, includes at least one model that models variable settings of the component or components for which the respective controller is responsible. The model is utilized by the respective controller to both adjust the modeled variable component settings and to determine a cost-variable of operation.

In operation of some embodiments, the master controller determines a possible incremental modification to one or more variables of the one or more components. The master controller then evaluates the determined variable modifications, in view of the one or more models of the master controller, to determine whether the modification will provide a cost benefit over current variable settings. It is possible the determined variable modifications will yield an infeasible result where the model reveals there will be no cost savings, cost savings that do not meet a minimum cost savings threshold, or may increase a cost of operation. In some such embodiments, upon a determination that the determined variable modification yields an infeasible result, the determined modification may be discarded and a new possible incremental modification to one or more variables of the one or more components is determined. Once a feasible possible incremental variable modification is determined, data representative of the possible incremental variable modification may be communicated to each of the slave controllers. Each slave controller then evaluates the possible incremental variable modification in view of the respective one or more models to obtain a possible cost saving measure, such as in a unit of currency, one or more measures of energy usage, and the like. Data representative of the possible cost saving measure is then returned from each slave controller to the master controller.

In such embodiments, the master controller, upon receipt of data representative of possible cost saving measure from each of the slave controllers, determines whether a total possible cost savings from the modification is feasible and at least meets a minimum threshold of cost savings. In making this determination, the master controller takes into account possible cost savings determined by the master controller and each of the slave controllers. In some embodiments, when one or more of the possible cost saving determinations from the slave controllers is that the possible change is infeasible, such as when the modifications will prevent a portion of the HVAC system from providing a desired temperature, the determined modification may be discarded and the process restarts. When the total possible cost savings is feasible and at least meets the minimum threshold of cost savings, the master controller implements the determined incremental modification to one or more variables of one or more components for which the master controller is responsible. Such components may include not only a boiler or a cooler, but also one or more fluid pumps, valves that can be manipulated to adjust piping routes, and other such mechanisms. Of note here is that, in some embodiments, the master controller does not send any messages to the slave controllers that the change is being made. Instead, each slave controller will adjust to changes sensed in a flow rate and temperature of fluid flow to its components and make changes independently to meet its need, such as represented by a thermostat temperature setting. The process may then be restarted, typically after having allowed the HVAC system to normalize for a period after having made the modification, such as a number of minutes or hours.

In such embodiments, each device in the central plant system affects the total operational costs in two ways: (1) by its actual costs (e.g. consumption of electricity by AHU fans), and (1) by its influence on other devices (e.g. boiler return water temperature is influenced by the AHUs). Therefore, the information provided by each downstream, slave controller may include: (1) marginal costs of the downstream plant, and (2) estimated changes of outputs of the downstream plant that act as input disturbances on the master plant. While the marginal costs are always provided by the downstream controllers, the changes of the outputs may not be included in some embodiments and replaced by an approximate local model kept by the master controller.

Such embodiments are based on the observation that it is typically easier to model individual components, or at least functional components (i.e., a boiler and one or more pumps), than the entirety of an HVAC system. Such embodiments are also based on the observation that it is often sufficient to manipulate outputs of a single plant to reduce consumption of the whole system because changes propagate from the single plant to the rest of the HVAC system through normal operation. Additionally, the incremental style of optimization of such embodiments (i.e., making small steps in the right direction with regard to cost optimization) is not only very robust but also removes the need for iterative negotiation between controllers. Additionally, implementation of these and other embodiments herein, typically leverage existing controller hardware and reduce the load of communication between these controllers. As such, implementation and setup is straightforward.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of an example HVAC system 100, according to an example embodiment. The HVAC system 100 is a boiler-based heating system. The illustrated HVAC system 100 is just one example of an HVAC system within which the various embodiments herein may be implemented. Other HVAC systems within which the various embodiment herein may be implemented include cooling or air conditioning HVAC systems, HVAC systems that include a boiler and an air conditioning plant, forced-air HVAC systems, and other HVAC systems.

The example HVAC system 100 includes a boiler plant 102, a controller 105, and a pump 104. The HVAC system 100 also includes two AHUs 106, 110. Each AHUs 106, 110 also includes a valve 108, 112, respectively, that control fluid flow into the AHUs 106, 110. The valve 108 not only controls fluid flow into the AHU 106, but also a route that fluid takes.

In some embodiments, the HVAC system 100 may include only the single controller 105 that includes models of each of the other HVAC system components, such as the AHUs 106, 110. However, one or both of the AHUs 106, 110 may also include a controller. The controllers of the AHUs and the boiler 102 controller 105 are each interconnected via wired or wireless data interconnection devices. The network to which such controllers are connected may be one or more of a dedicated network, a local area network, the Internet, or other network.

In some embodiments, the boiler 102 controller 105 includes a model of boiler variables that are modifiable by the boiler 102 controller 105. The model of boilers variables may include a temperature of supply water (Tsw), a flow rate of supply water (Mhw), and a temperature of return water (Trw). The boiler 102 controller 105 may have a current cost over operation stored in memory. The boiler 102 controller 105 may then periodically determine whether additional cost savings may be found through proposing possible variable modifications and determining a likely cost savings within the boiler 102 controller 105 based on the model. The boiler 102 controller 105 may then transmit data representative of the proposed changes to each slave controller, such as the controllers of the AHUs 106, 110. The AHUs 106, 110 will evaluate the proposed changes and determine a likely cost of operation impact. The AHU controllers may then transmit, back to the boiler 102 controller 105, data representative of the cost impact. The data transmitted back may also include data representative of modeled variables of the AHU 106, 110 controllers, such as a temperature and flow rates of return water (Trw and Mrw, respectively). The boiler 102 controller 105 then considers this data in making further determinations based on the returned data, and decide whether to implement the proposed changes. When the changes are determined to be likely to provide a cost of operation improvement, the boiler 102 controller 105 implements the changes in the boiler 102 and associated components, such as the valve 104.

Figure 2:
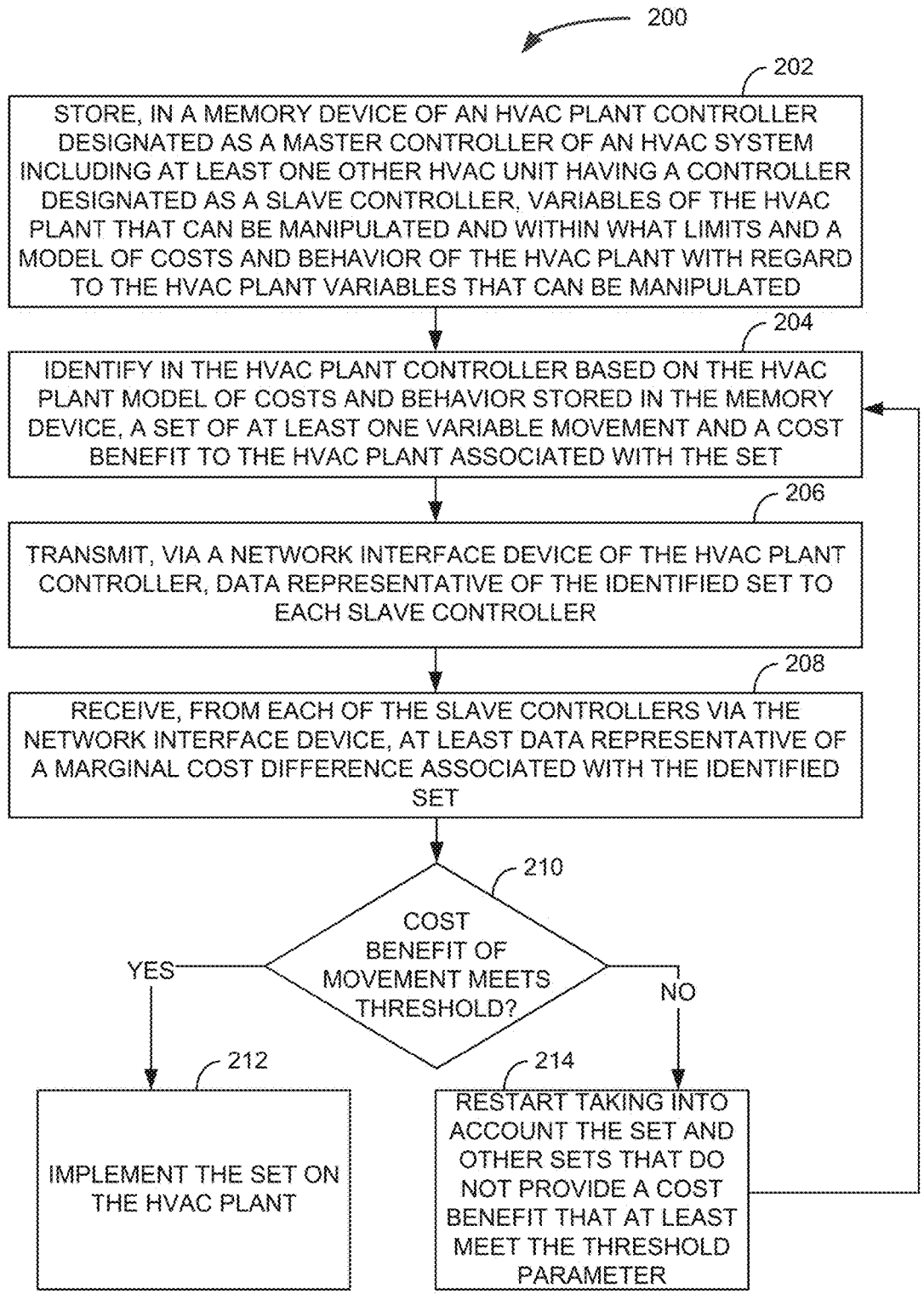
FIG. 2 is a block flow diagram of a method, according to an example embodiment.

FIG. 2 is a block flow diagram of a method 200, according to an example embodiment. The method 200 is an example of a method that may be performed within a plant controller of an HVAC system, such as within the boiler 102 controller 105 of FIG. 1. The method may be implemented on a data processing device implemented as an HVAC plant controller, such as the data processing device illustrated and described with regard to FIG. 3.

The method 200, in some embodiments, is implemented at least in part in an HVAC plant controller, such as a boiler controller, designated as a master controller of an HVAC system including at least one other HVAC unit, such as one or more of an AHU and a RTU, having a controller designated as a slave controller. The method 200, in some embodiments, includes storing 202, in a memory device of the HVAC plant controller, variables of the HVAC plant that can be manipulated and within what limits the variables may be manipulated. The memory also stores 202 a model of costs and behavior of the HVAC plant with regard to the HVAC plant variables that can be manipulated. The method 200 further includes identifying 204, through execution of instructions on at least one processor of the HVAC plant controller based on the HVAC plant model of costs and behavior stored in the memory device, a set of at least one variable movement and a cost benefit to the HVAC plant associated with the set. The method 200 may then transmit 206, via a network interface device of the HVAC plant controller, data representative of the identified set to each slave controller. The HVAC plant controller then receives 208, from each of the slave controllers via the network interface device, at least data representative of a marginal cost difference associated with the identified set.

The method 200, and in particular the HVAC plant controller, continues processing, based on the identified cost benefit to the HVAC plant and the data received from each slave controller representative of the marginal cost difference associated with the identified set, to determine 210 whether the set would provide a cost benefit that at least meets a threshold parameter. When the set is determined 210 to provide a cost benefit that at least meets the threshold parameter, the method 200 includes implementing 212 the set on the HVAC plant. However, when the set is determined 210 to not provide a cost benefit that at least meets the threshold parameter, the method 200 includes restarting 214 the method 200 taking into account the set and other sets that do not provide a cost benefit that at least meet the threshold parameter. In some embodiments, the method 200 is performed on a recurring basis in an effort to identify opportunities for continued cost optimization.

In some embodiments of the method 200, implementing 212 the set on the HVAC plant does not include transmitting any data commands to any of the slave controllers. Instead, the slave controller becomes aware of the implemented 212 changes by monitoring HVAC system variables during operation, such as Tsw and Msw.

In some embodiments of the method 200, identifying 204 the set and the cost benefit to the HVAC plant associated with the set includes identifying a plurality of sets of at least one variable movement and a respective cost benefit to the HVAC plant associated with the respective sets. The transmitting 206 of data representative of the identified set of at least one variable movement to each slave controller in such embodiments includes transmitting each of the plurality of sets. Additionally in such embodiments, receiving 208 at least data representative of the marginal cost difference associated with the identified set includes receiving data representative of the marginal cost difference with regard to each of the sets. Thus, the determining 210 whether the set would provide a cost benefit that at least meets a threshold parameter in such embodiments includes selecting a set from the plurality of sets of that provides a greatest cost benefit and determining whether the selected set would provide a cost benefit that at least meets the threshold parameter. When the threshold parameter is met, the method 200 implements 212 the set on the HVAC plant, otherwise the method 200 is restarted 214.

In some additional embodiments of the method 200, identifying 204 the set of at least one variable movement and a cost benefit to the HVAC plant associated with the set includes choosing at least one incremental change to the at least one variables and determining cost and behaviors likely to result from the chosen at least one incremental change. In such embodiments, when the determined behavior is likely to maintain a desired state of HVAC plant operation (i.e., maintain a desired temperature) and the cost is a beneficial movement, identifying the at least one incremental change and its associated cost benefit as the set of at least one variable movement and associated cost benefit.

In some embodiments, receiving 208 at least data representative of the marginal cost difference associated with the identified set includes receiving data representative of infeasibility indicating that the identified set does not allow a respective slave controller to meet at least one constraint or setting of the HVAC system. In some such embodiments, the master controller may then take at least one of the infeasibility and constraints into account in choosing one of a plurality of identified sets or in determining a new set.

Figure 3:
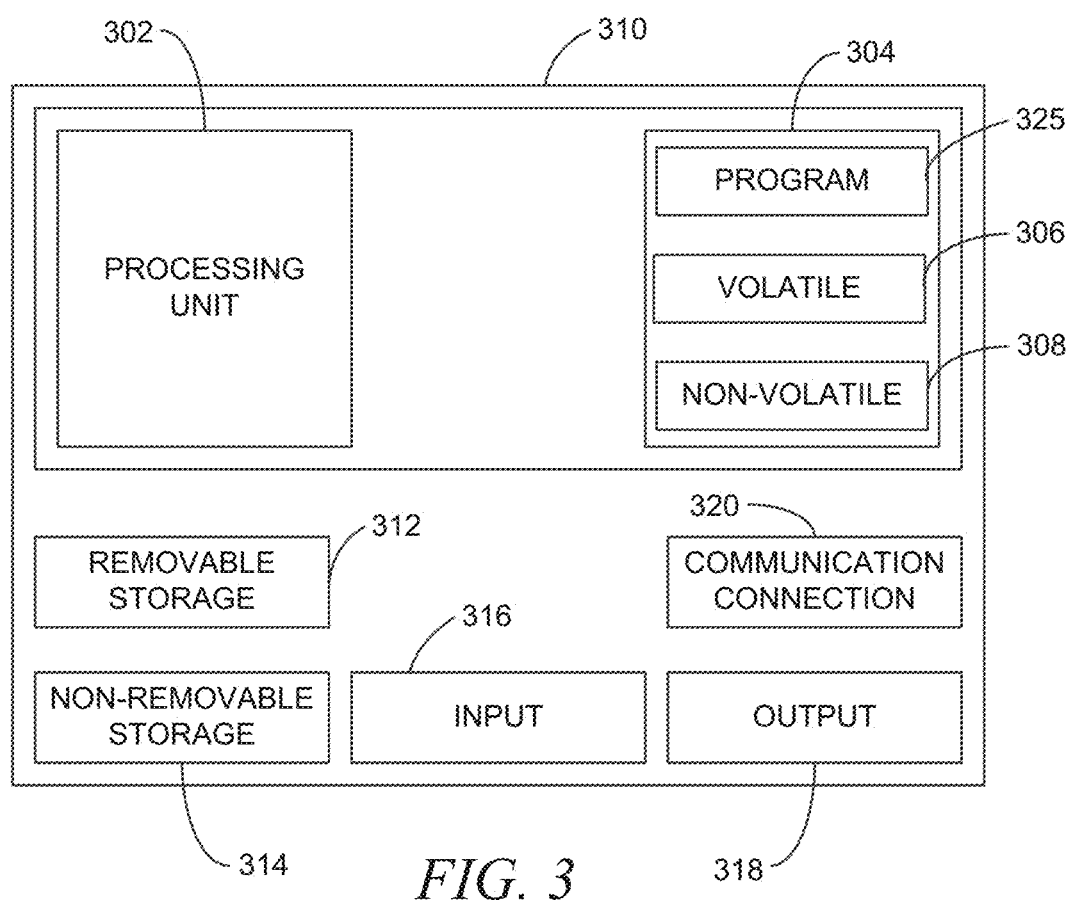
FIG. 3 is a block diagram of a computing device, according to an example embodiment.

FIG. 3 is a block diagram of a computing device, according to an example embodiment. In one embodiment, multiple such computer systems are utilized in a distributed network to implement multiple components in a HVAC system. An object-oriented, service-oriented, or other architecture may be used to implement such functions and communicate between the multiple systems and components. One example computing device in the form of a computer 310, may include a processing unit 302, memory 304, removable storage 312, and non-removable storage 314. Although the example computing device is illustrated and described as computer 310, the computing device may be in different forms in different embodiments. For example, the computing device may instead take a more simple form, including few components depending the computing requirements of a particular embodiment. Further, although the various data storage elements are illustrated as part of the computer 310, the storage, processor, and other functional elements may also or alternatively include cloud-based elements and solutions accessible via a network, such as the Internet, a local area network, a wide area network, and the like.

Returning to the computer 310, memory 304 may include volatile memory 306 and non-volatile memory 308. Computer 310 may include—or have access to a computing environment that includes a variety of computer-readable media, such as volatile memory 306 and non-volatile memory 308, removable storage 312 and non-removable storage 314. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 310 may include or have access to a computing environment that includes input 316, output 318, and a communication connection 320. The input 316 may include one or more of a touchscreen, touchpad, mouse, keyboard, camera, and other input devices. The computer may operate in a networked environment using a communication connection 320 to connect to one or more remote computers, such as a master or slave HVAC system component controller, database servers, web servers, and other computing devices. An example remote computer may include a personal computer (PC), an HVAC plant controller, a server, router, network PC, a peer device or other common network node, or the like. The communication connection 320 may be a network interface device such as one or both of an Ethernet card and a wireless card or circuit that may be connected to a network. The network may include one or more of a Local Area Network (LAN), a Wide Area Network (WAN), the Internet, and other networks.

Computer-readable instructions stored on a computer-readable medium are executable by the processing unit 302 of the computer 310. A hard drive (magnetic disk or solid state), CD-ROM, and RAM are some examples of articles including a non-transitory computer-readable medium. For example, various computer programs 325 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
storing, in a memory device of a Heating, Ventilation, and Air Conditioning (HVAC) plant controller designated as a master controller of an HVAC system including at least one other HVAC unit having a controller designated as a slave controller, variables of the HVAC plant that can be manipulated and within what limits and a model of costs and behavior of the HVAC plant with regard to the HVAC plant variables that can be manipulated;
identifying, through execution of instructions on at least one processor of the HVAC plant controller based on the HVAC plant model of costs and behavior stored in the memory device, a set of at least one variable movement and a cost benefit to the HVAC plant associated with the set;
transmitting, via a network interface device of the HVAC plant controller, data representative of the identified set to each slave controller;
receiving, from each of the slave controllers via the network interface device, at least data representative of a marginal cost difference associated with the identified set;
based on the identified cost benefit to the HVAC plant and the data received from each slave controller representative of the marginal cost difference associated with the identified set, determining whether the set would provide a cost benefit that at least meets a threshold parameter arid:
when the set provides a cost benefit that at least meets the threshold parameter, implementing the set on the HVAC plant; and
when the set does not provide a cost benefit that at least meets the threshold parameter, restarting the method taking into account the set and other sets that do not provide a cost benefit that at least meet the threshold parameter; and
wherein:
identifying the set and the cost benefit to the HVAC plant associated with the set includes identifying a plurality of sets of at least one variable movement and a respective cost benefit to the HVAC plant associated with the respective sets;
transmitting data representative of the identified set of at least one variable movement to each slave controller includes transmitting each of the plurality of sets;
receiving at least data representative of the marginal cost difference associated with the identified set includes receiving data representative of the marginal cost difference with regard to each of the sets; and
determining whether the set would provide a cost benefit that at least meets a threshold parameter includes:
selecting a set from the plurality of sets of that provides a greatest cost benefit; and
for the selected set that provides the greatest cost benefit, determining whether the selected set would provide a cost benefit that at least meets the threshold parameter.

2. The method of claim 1, wherein implementing the set on the HVAC plant does not include transmitting any data commands to any of the slave controllers.

3. The method of claim 1, wherein identifying the set of at least one variable movement and a cost benefit to the HVAC plant associated with the set includes:
choosing at least one incremental change to the at least one variables;
determining cost and behaviors to result from the chosen at least one incremental change;
when the determined behavior is to maintain a desired state of HVAC plant operation and the cost is a beneficial movement, identifying the at least one incremental change and its associated cost benefit as the set of at least one variable movement and associated cost benefit.

4. The method of claim 1, wherein the HVAC plant is a boiler and the at least one other HVAC unit is an air handling unit.

5. The method of claim 1, wherein the variables of the HVAC plant that can be manipulated include at least a temperature of supply fluid provided by the HVAC plant and a flow rate supply fluid provided by the HVAC plant.

6. The method of claim 1, wherein receiving at least data representative of the marginal cost difference associated with the identified set includes receiving data representative of infeasibility indicating that the identified set does not allow a respective slave controller to meet at least one constraint or setting of the HVAC system.

7. A Heating, Ventilation, and Air Conditioning HVAC plant controller comprising:
at least one processor;
at least one network interface device;
at least one memory device storing:
HVAC plant controller configuration data, the configuration data including:
data designating the HVAC controller as a master controller of an HVAC system including at least one other HVAC unit having a controller designated as a slave controller; and
variables of an HVAC plant that the HVAC plant controller controls that can be manipulated and within what limits and a model of costs and behavior of the HVAC plant with regard to the HVAC plant variables that can be manipulated;
a control module including instructions executable by the at least one processor to:
identify, based on the stored HVAC plant model of costs and behavior, a set of at least one variable movement and a cost benefit to the HVAC plant associated with the set;
transmit, via the network interface device, data representative of the identified set to each slave controller;
receive, from each of the slave controllers via the network interface device, at least data representative of a marginal cost difference associated with the identified set;
based on the identified cost benefit to the HVAC plant and the data received from each slave controller representative of the marginal cost difference associated with the identified set, determine whether the set would provide a cost benefit that at least meets a threshold parameter and implement the set on the HVAC plant when the set provides a cost benefit that at least meets the threshold parameter, otherwise, iterating execution of the control module taking into account the set and other sets that do not provide a cost benefit that at least meet the threshold parameter; and wherein identifying the set of at least one variable movement and a cost benefit to the HVAC plant associated with the set includes:
choosing at leas one incremental change to the at least one variables;
determining cost and behaviors to result from the chosen at least one incremental change; and
when the determined behavior is to maintain a desired state of HVAC plant operation and the cost is a beneficial movement, identifying the at least one incremental chance and its associated cost benefit as the set of at least one variable movement and associated cost benefit.

8. The HVAC plant controller of claim 7, wherein implementing the set on the HVAC plant does not include transmitting any data commands to any of the slave controllers.

9. The HVAC plant controller of claim 7, wherein, in the control module:
identifying the set and the cost benefit to the HVAC plant associated with the set includes identifying a plurality of sets of at least one variable movement and a respective cost benefit to the HVAC plant associated with the respective sets;
transmitting data representative of the identified set of at least one variable movement to each slave controller includes transmitting each of the plurality of sets; and
receiving at least data representative of the marginal cost difference associated with the identified set includes receiving data representative of the marginal cost difference with regard to each of the sets; and
determining whether the set would provide a cost benefit that at least meets a threshold parameter includes:
selecting a set from the plurality of sets of that provides a greatest cost benefit; and
for the selected set that provides the greatest cost benefit, determining whether the selected set would provide a cost benefit that at least meets the threshold parameter.

10. The HVAC plant controller of claim 7, wherein the HVAC plant controlled by the HVAC plant controller is a cooling plant and the at least one other HVAC unit is an air handling unit.

11. The HVAC plant controller of claim 7, wherein, in the controller module, the variables of the HVAC plant that can be manipulated include at least a temperature of supply fluid provided by the HVAC plant and a flow rate supply fluid provided by the HVAC plant.

12. The HVAC plant controller of claim 11, wherein the supply fluid is cooled water-based fluid.

13. A non-transitory machine-readable medium, with instructions stored thereon, which when executed by at least one processor of a machine, cause the machine to:
store, in a memory device of a Heating, Ventilation, and Air Conditioning (HVAC) plant controller, HVAC plant controller configuration data, the configuration data including:
data designating the HVAC controller as a master controller of an HVAC system including at least one other HVAC unit having a controller designated as a slave controller; and
variables of an HVAC plant that the HVAC plant controller controls that can be manipulated and within what limits and a model of costs and behavior of the HVAC plant with regard to the HVAC plant variables that can be manipulated;

identify, based on the HVAC plant model of costs and behavior stored in the memory device, a set of at least one variable movement and a cost benefit to the HVAC plant associated with the set; transmit, via a network interface device of the HVAC plant controller, data representative of the identified set to each slave controller;
receive, from each of the slave controllers via the network interface device, a data representative of a marginal cost difference associated with the identified set;
based on the identified cost benefit to the HVAC plant and the data received from each slave controller representative of the marginal cost difference associated with the identified set, determine whether the set would provide a cost benefit that at least meets a threshold parameter and implement the set on the HVAC plant when the set provides a cost benefit that at least meets the threshold parameter, otherwise, iterating execution of the instructions taking into account the set and other sets that do not provide a cost benefit that at least meet the threshold parameter; and
wherein identifying the set of at least one variable movement and a cost benefit to the HVAC plant associated with the set includes:
choosing at least one incremental change to the at least one variables:
determining cost and behaviors to result from the chosen at least one incremental change;
when the determined behavior is to maintain a desired state of HVAC plant operation and the cost is a beneficial movement, identifying the at least one incremental change and its associated cost benefit as the set of at least one variable movement and associated cost benefit.

14. The non-transitory machine-readable medium of claim 13, wherein implementing the set on the HVAC plant does not include transmitting any data commands to any of the slave controllers.

15. The non-transitory machine-readable medium of claim 13, wherein:
identifying the set and the cost benefit to the HVAC plant associated with the set includes identifying a plurality of sets of at least one variable movement and a respective cost benefit to the HVAC plant associated with the respective sets;
transmitting data representative of the identified set of at least one variable movement to each slave controller includes transmitting each of the plurality of sets; and
receiving at least data representative of the marginal cost difference associated with the identified set includes receiving data representative of the marginal cost difference with regard to each of the sets; and
determining whether the set would provide a cost benefit that at least meets a threshold parameter includes:
selecting a set from the plurality of sets of that provides a greatest cost benefit; and
for the selected set that provides the greatest cost benefit, determining whether the selected set would provide a cost benefit that at least meets the threshold parameter.

16. The non-transitory machine-readable medium of claim 13, wherein the HVAC plant controlled by the HVAC plant controller is a cooling plant and the at least one other HVAC unit is an air handling unit.

17. The non-transitory machine-readable medium of claim 13, wherein the variables of the HVAC plant that can be manipulated include at least a temperature of supply fluid provided by the HVAC plant and a flow rate supply fluid provided by the HVAC plant.

* * * * *